Oct. 18, 1932.　　　P. B. REEVES　　　1,883,821
DRIVING BELT
Filed July 30, 1928
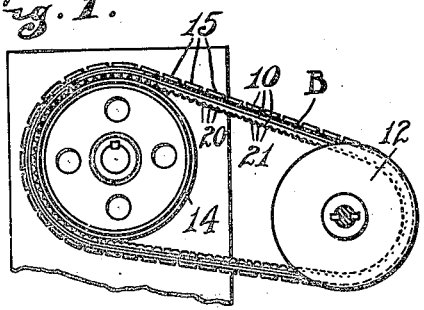
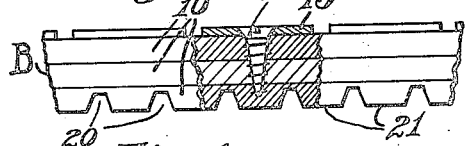
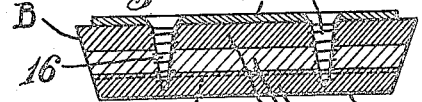
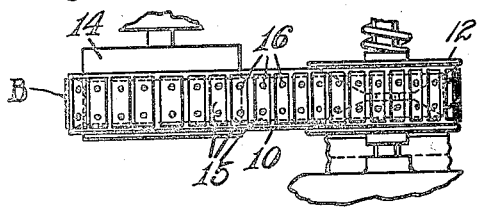
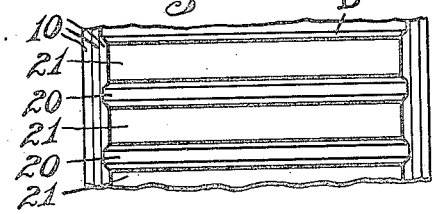
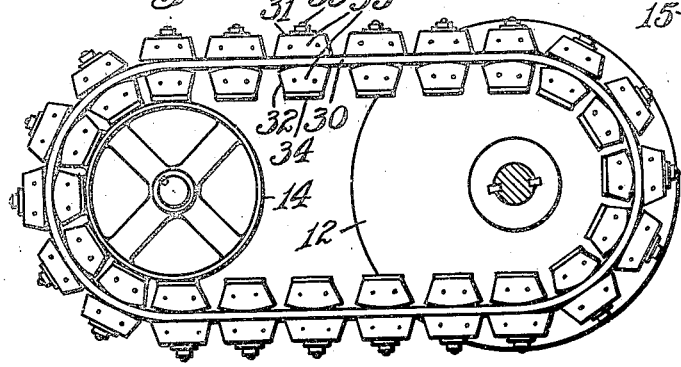
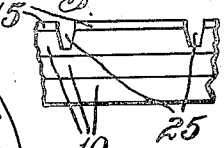
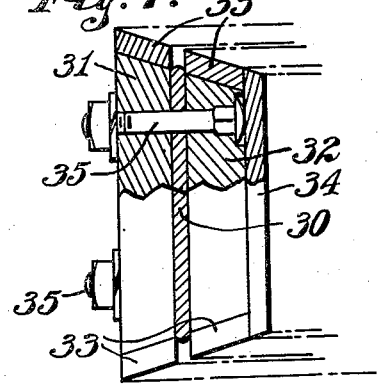
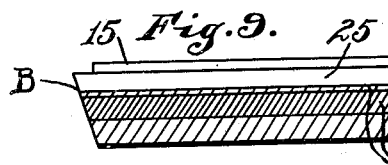
INVENTOR.
Paul B. Reeves,
BY
Hood + Hahn.
ATTORNEYS Patented Oct. 18, 1932

1,883,821

UNITED STATES PATENT OFFICE

PAUL B. REEVES, OF COLUMBUS, INDIANA, ASSIGNOR TO REEVES PULLEY COMPANY, OF COLUMBUS, INDIANA, A CORPORATION OF INDIANA

DRIVING BELT

Application filed July 30, 1928. Serial No. 296,139.

The object of my invention is to produce a driving belt of such form as shall be capable of efficient simultaneous coaction with a flat faced pulley and an adjustable cone-pair carried by parallel shafts; the construction being such that the full power from one shaft may be delivered to the companion shaft.

The accompanying drawing illustrates my invention.

Fig. 1 is a side elevation of an embodiment of my invention in coactive relation with a flat faced pulley and an adjustable cone-pair;

Fig. 2 a plan of the construction shown in Fig. 1;

Fig. 3 a longitudinal section of a fragment of the belt shown in Figs. 1 and 2;

Fig. 4, a transverse section of the belt shown in Fig. 3;

Fig. 5, an elevation of the inner face of the belt shown in Figs. 1 to 4;

Fig. 6 an elevation, of another embodiment of my improved belt associated with a flat-faced pulley and an adjustable cone-pair;

Fig. 7 a transverse section of the belt shown in Fig. 6;

Fig. 8 an edge elevation of a fragment of another embodiment of my invention; and Fig. 9 is a transverse section of the form shown in Fig. 8.

In Figs. 1 to 5 and 8 and 9 inclusive B indicates a flexible belt, composed of several laminations 10, 10, 10, said belt having a sufficient thickness to enable it to transmit the desired power by reasons of forces or resistances applied to its edge by an adjustable cone-pair 12 and the exposed face of the inner laminations being of a character to properly frictionally contact with a flat-faced pulley 14. Such a belt would not, itself, be sufficiently transversely rigid to properly coact with the cone-pair and I, therefore, secure to its outer face a plurality of stiffening plates 15, conveniently by screws 16, which plates extend almost, but not quite, to the side edges of this face of the belt.

The sides of this belt are oppositely inclined inwardly to the inner face of the belt as shown in Fig. 4. Such a belt, with sufficient thickness to properly coact with the cone-pair, would not be sufficiently flexible to permit it to properly coact with a flat faced pulley. To produce the desired flexibility I transversely groove one face of the belt.

In Figs. 1 to 5 the inner face of the belt is grooved with a multiplicity of transverse grooves 20, preferably equally spaced, thus forming a plurality of laterally separated friction faces 21 of such dimensions as to be capable in groups of transmitting substantially the same power as will be involved in the coaction of the active portions of the edges of the belt with the cone-pair.

In Figs. 8 and 9 the outer face of the belt is channeled by the transverse grooves 25 between adjacent edges of the stiffener plates.

In the form shown in Figs. 6 and 7 the belt is composed of a comparatively thin medial web 30 to the outer and inner faces of which are secured in pairs the rigid cross bars 31, 32 conveniently of wood, the ends of which are oppositely and inwardly inclined toward the inner faces of bars 32 to correspond with the angles of the faces of the cone-pair 12. The inclined faces of the cross pieces 31, 32 are faced with friction material 33, such as leather, and the inner faces of cross-pieces 32 are similarly faced, as indicated at 34, said facings 34 preferably covering the inner ends of the bolts 35 by which the cross pieces 31 and 32 are secured to the medial web 30.

It is important that the belt be sufficiently flexible at right angles to its plane of movement to permit its inner friction face to properly contact with the flat faced pulley around which it is to be passed and consequently, when the active inner face portions of the belt are relatively movable in the line of movement of the belt, as in the forms shown in Figs. 3, 4, 6 and 7, adjacent edges transversely of the belt of such active faces (21 in Figs. 3 and 5, and 34 in Figs. 6 and 7) must be actually separated from each other lengthwise of the belt except when the belt is fully flexed, as otherwise a proper frictional coaction with a flat-faced pulley cannot be obtained.

I claim as my invention:

1. A power transmission belt comprising a plurality of attached layers of leather cooperating to provide at their opposite edges oppositely equally beveled driving surfaces, a plurality of spaced stiffener plates applied to the wider face of the belt, fastening members passing through said plates into the body of the belt, the narrowest layer of the belt presenting an inner peripheral driving surface transversely grooved to a depth less than the thickness of said layer.

2. A power transmission belt comprising a plurality of attached layers of leather providing opposite driving edges oppositely equally beveled, a plurality of spaced stiffener plates applied to the wider face of the belt, and fastening means passing through said plates into the body of the belt, the narrower layer of the belt presenting a driving surface and being formed, in said driving surface, with a plurality of transverse grooves, by the removal of material therefrom to a depth less than the thickness of said layer.

In witness whereof, I, PAUL B. REEVES, have hereunto set my hand at Columbus, Indiana, this 26th day of July, A. D. one thousand nine hundred and twenty-eight.

PAUL B. REEVES.